(12) United States Patent
Nakamura

(10) Patent No.: US 9,041,950 B2
(45) Date of Patent: May 26, 2015

(54) IMAGE FORMING APPARATUS, METHOD FOR CONTROLLING IMAGE FORMING APPARATUS, AND PROGRAM

(71) Applicant: CANON KABUSHIKI KAISHA, Tokyo (JP)

(72) Inventor: Shun Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/054,155

(22) Filed: Oct. 15, 2013

(65) Prior Publication Data

US 2014/0111826 A1 Apr. 24, 2014

(30) Foreign Application Priority Data

Oct. 18, 2012 (JP) ................................. 2012-230601

(51) Int. Cl.
*G06K 15/00* (2006.01)
*G06K 15/02* (2006.01)

(52) U.S. Cl.
CPC .......... *G06K 15/409* (2013.01); *G06K 15/1823* (2013.01); *G06K 15/4055* (2013.01)

(58) Field of Classification Search
USPC .......... 358/1.13, 1.14, 1.15, 1.16; 399/36, 37, 399/88
See application file for complete search history.

(56) References Cited

FOREIGN PATENT DOCUMENTS

JP 2010-26037 A 2/2010

*Primary Examiner* — Vu B Hang
(74) *Attorney, Agent, or Firm* — Canon U.S.A., Inc. IP Division

(57) ABSTRACT

An image forming apparatus includes a switching unit configured to switch a power supply source from a main power source to a power storage unit according to shifting to a power failure state, a calculation unit configured to calculate a power amount to be consumed by a received job if the power supply source is the power storage unit when the job is received, a detection unit configured to detect a power amount stored in the power storage unit, a determining unit configured to determine whether the received job can be executed based on the detected power amount and the calculated power amount to be consumed for the received job, and a control unit configured to start processing the job if it is determined that the received job can be executed and to perform control during the processing of the job so as not to accept a subsequently received job.

9 Claims, 16 Drawing Sheets

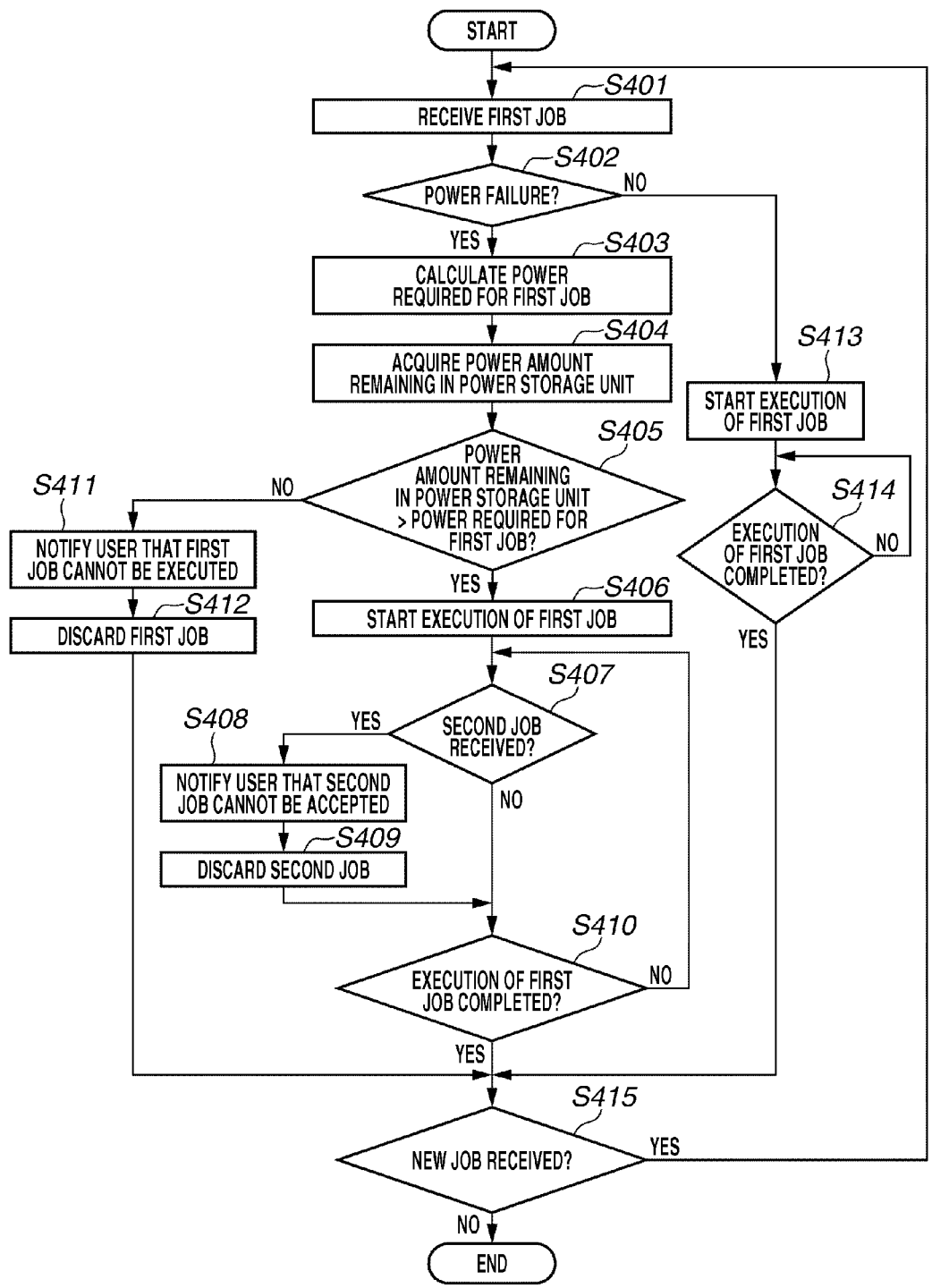

FIG.5A

 <POWER IS OUT NOW>

JOB CANNOT BE EXECUTED BECAUSE REMAINING
CAPACITY OF SECONDARY BATTERY IS INSUFFICIENT.

REMAINING BATTERY CAPACITY: 15%

REQUIRED BATTERY CAPACITY: 25%

TRY AGAIN AFTER POWER RECOVERS.

FIG.5B

 <POWER IS OUT NOW>

JOB CANNOT BE EXECUTED BECAUSE REMAINING
CAPACITY OF SECONDARY BATTERY IS INSUFFICIENT.

REMAINING BATTERY CAPACITY: 15%

REQUIRED BATTERY CAPACITY: 25%

TRY AGAIN AFTER POWER RECOVERS.

⚠ THE FOLLOWING IS DETAILED INFORMATION OF PRECEDING JOB BEING EXECUTED.

ACCEPTANCE NUMBER: 0002

801 — STATUS: PRINTING

| ☐ ACCEPTED TIME | ▷ 03/26 2012 10:32 |
|---|---|
| ☐ DEPARTMENT ID | ▷ ------- |
| ☐ JOB TYPE | ▷ 📄 COPY |
| ☐ FILE NAME | ▷ |
| ☐ USER NAME | ▷ |
| ☐ NUMBER OF PAGES × NUMBER OF COPIES | ▷ 📄 1 × 📑 0/ 1 |

802

OK

803

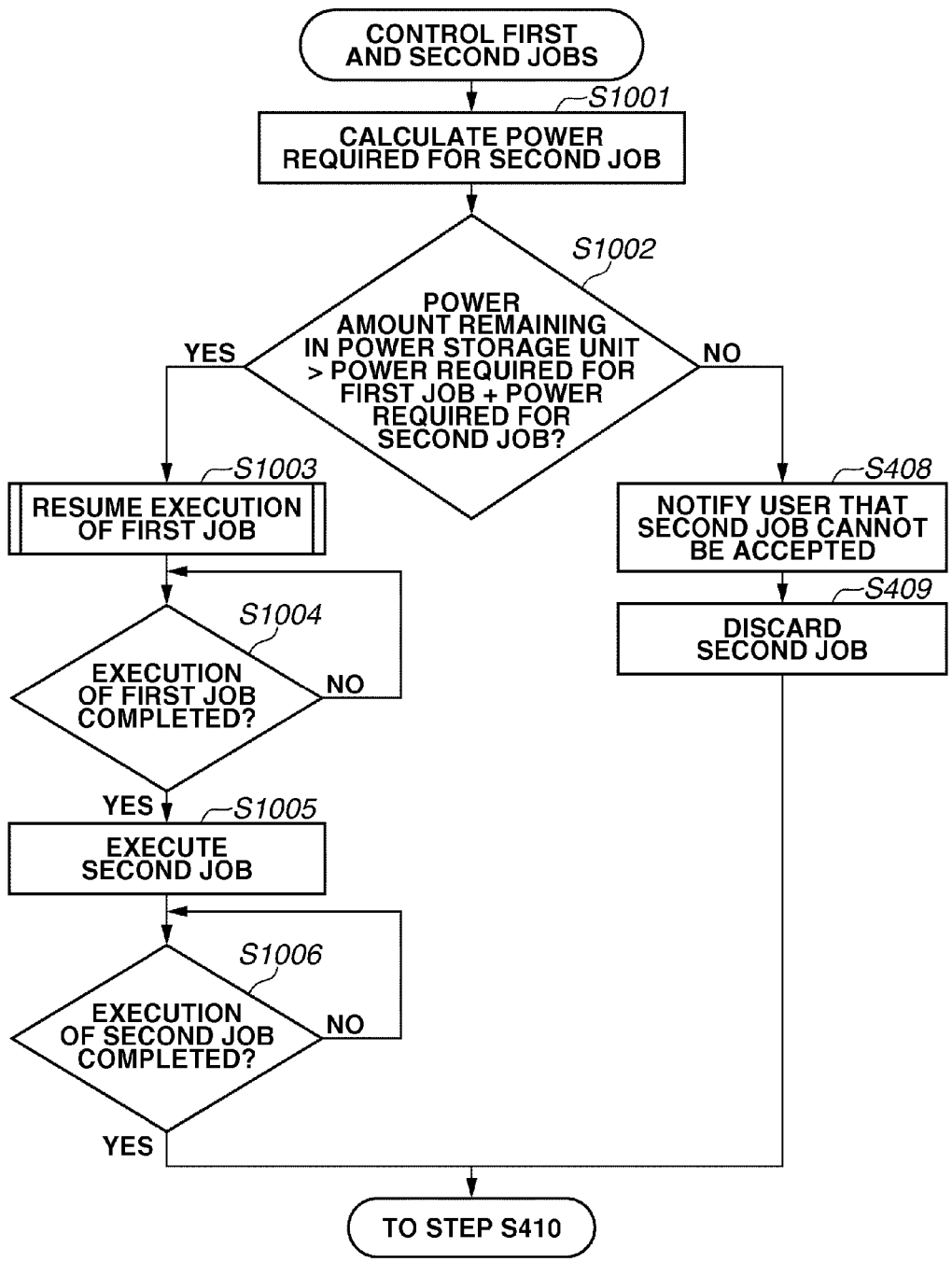

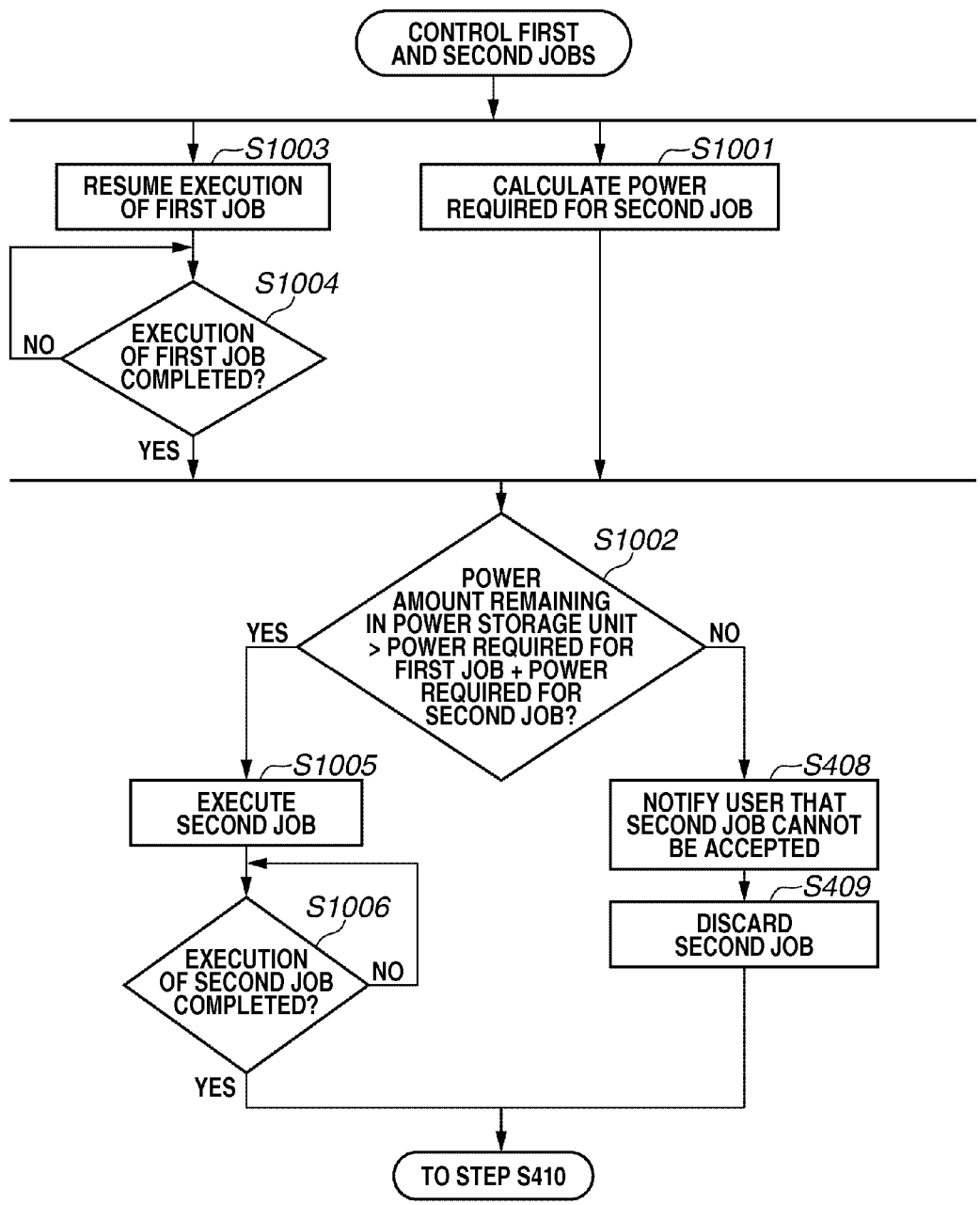

IMAGE FORMING APPARATUS, METHOD FOR CONTROLLING IMAGE FORMING APPARATUS, AND PROGRAM

BACKGROUND OF THE INVENTION

1. Field of the Invention

The present invention relates to an image forming apparatus including a secondary battery, a method for controlling the image forming apparatus, and a program.

2. Description of the Related Art

Conventionally, among image forming apparatuses (multifunction peripherals (MFPs)) that have an information processing function and operate based on, for example, the electrophotographic method, some have been provided with a secondary battery. Such a secondary battery is connected to a commercial power source, and allows execution of print/copy control for print, copy, scan, facsimile, and the like, and supply of power for backing up some required information, even when power supply from the commercial power source stops due to a power failure.

Regarding such MFPs using power supply from the secondary battery, for example, Japanese Patent Application Laid-Open No. 2010-26037 discusses a technique for determining whether execution of a job can be continued according to a power storage state of the secondary battery and the type of the job being executed when a power failure is detected. This technique is directed to, in an MFP configured to operate using the secondary battery when power supply stops due to, for example, a power failure, minimizing a trouble due to the stop of power supply by performing optimum job control according to a charged amount even when a power storage unit is not sufficiently charged at the time of the stop of power supply.

However, the technique discussed in Japanese Patent Application Laid-Open No. 2010-26037 determines whether the MFP can continue the job being executed at the time of the stop of power supply. Determining whether the MFP can accept a job newly received after this moment is not discussed in Japanese Patent Application Laid-Open No. 2010-26037.

Therefore, the following problem may arise. For example, suppose that a power failure occurs during execution of a certain job, and as a result of a determination about whether the job can be continued according to the technique discussed in Japanese Patent Application Laid-Open No. 2010-26037, the MFP determines that the MFP can continue to execute this job. Then, in this state, the MFP receives a second job, whereby the MFP consumes the stored power amount for acceptance thereof. As a result, the stored power amount falls below a power amount required for completion of the execution of the first job, thus making completion of the execution of the first job impossible.

Therefore, the following problem may arise. Regarding the MFP configured to operate using the secondary battery at the time of a power failure, suppose that this MFP is operating using the secondary battery, for example, when a power failure occurs during execution of a certain job. Then, as a result of the determination about whether the job can be continued according to the technique discussed in Japanese Patent Application Laid-Open No. 2010-26037, the MFP determines that the MFP can continue this job. In this state, the MFP receives a second job. In this case, the MFP consumes the stored power amount by accepting this second job, by which the stored power amount falls below a power amount required for completion of the execution of the first job, thus making completion of the execution of the first job impossible.

More specifically, there is the following problem. Upon reception of a job, the MFP calculates a power amount required to execute this job in the determination about whether the job can be continued according to the technique discussed in Japanese Patent Application Laid-Open No. 2010-26037. Then, the MFP accepts the job if the calculation result is less than the current remaining capacity of the secondary battery. Therefore, the MFP becomes unable to complete a preceding job that is being executed.

SUMMARY OF THE INVENTION

The present invention is directed to an image forming apparatus capable of completing a job accepted first without accepting a subsequent job, when a power supply source is switched to stored power due to, for example, a power failure.

According to an aspect of the present invention, an image forming apparatus configured to perform job processing includes a switching unit configured to switch a power supply source from a main power source to a power storage unit according to the image forming apparatus shifting to a power failure state, a reception unit configured to receive a job, a calculation unit configured to calculate a power amount to be consumed by the received job if the power supply source is the power storage unit when the job is received, a detection unit configured to detect a power amount stored in the power storage unit, a determining unit configured to determine whether the received job can be executed based on the detected power amount and the calculated power amount to be consumed by processing the received job, and a control unit configured to start processing the job if the determining unit determines that the received job can be executed and to perform control during the processing of the job so as not to accept a job subsequently received by the reception unit.

Further features of the present invention will become apparent from the following description of exemplary embodiments with reference to the attached drawings.

BRIEF DESCRIPTION OF THE DRAWINGS

FIG. 4 is a flowchart illustrating a method for controlling the image forming apparatus according to a first exemplary embodiment.

FIGS. 5A and 5B each illustrate a user interface (UI) screen that notifies a user of a result about whether a received job is accepted.

FIG. 8 illustrates a UI screen that notifies the user of the result about whether the received job is accepted.

FIG. 10 is a flowchart illustrating a method for controlling the image forming apparatus according to the second exemplary embodiment.

FIGS. 11A and 11B each are a flowchart illustrating a method for controlling an image forming apparatus according to a third exemplary embodiment.

DESCRIPTION OF THE EMBODIMENTS

Various exemplary embodiments, features, and aspects of the invention will be described in detail below with reference to the drawings.

Figure 1:
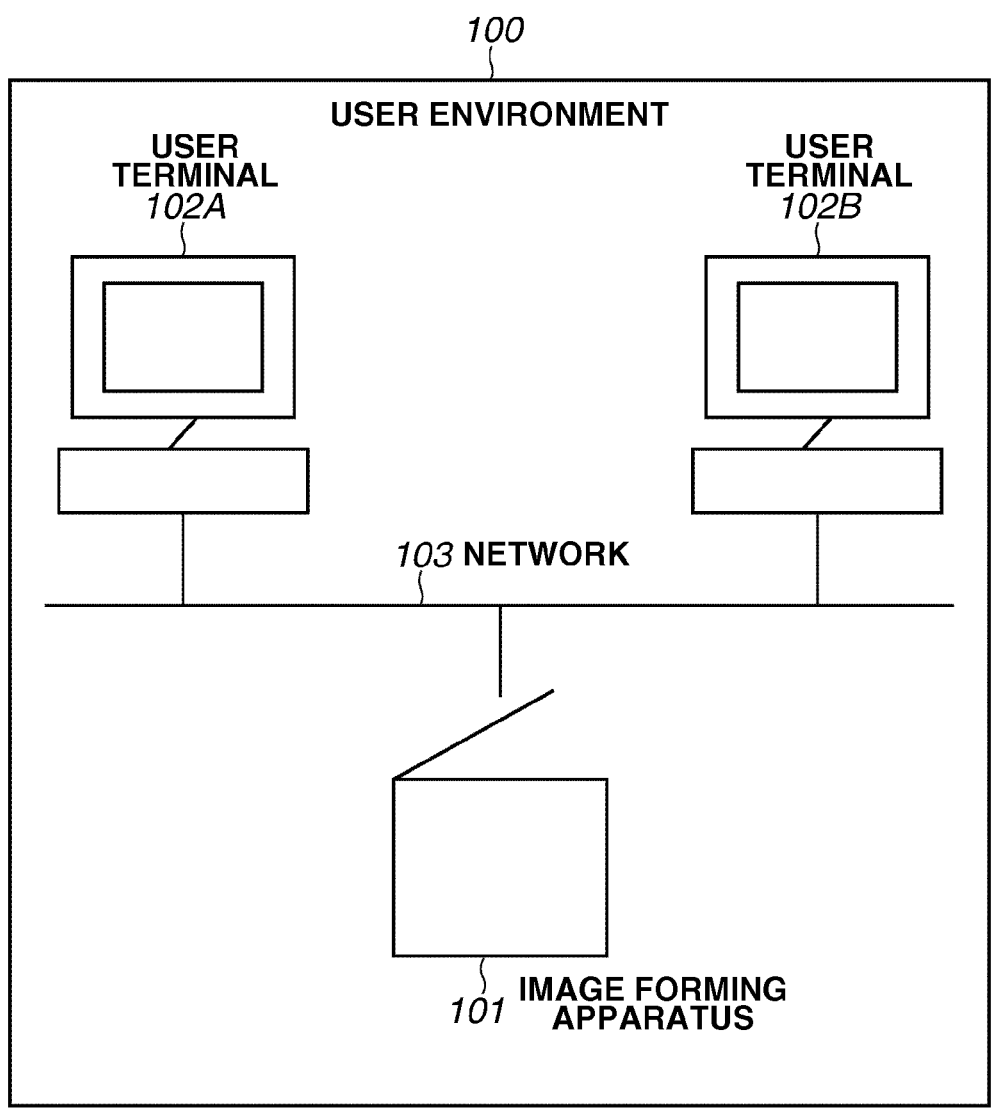
FIG. 1 illustrates an example of a configuration of a network system to which an image forming apparatus is applied.

FIG. 1 illustrates an example of a configuration of a network system to which an image forming apparatus according to a first exemplary embodiment is applied.

Referring to FIG. 1, an image forming apparatus 101 according to the first exemplary embodiment performs print/copy control for print, copy, scan, facsimile, and the like according to an operation by a user in a user environment 100. Terminal apparatuses 102A and 102B are computers or mobile information terminals operable by the user. These image forming apparatus 101 and terminal apparatuses 102A and 102B in the user environment 100 are able to communicate with each other via a network 103. The network 103 may be the Internet or may be an intranet.

Figure 2:
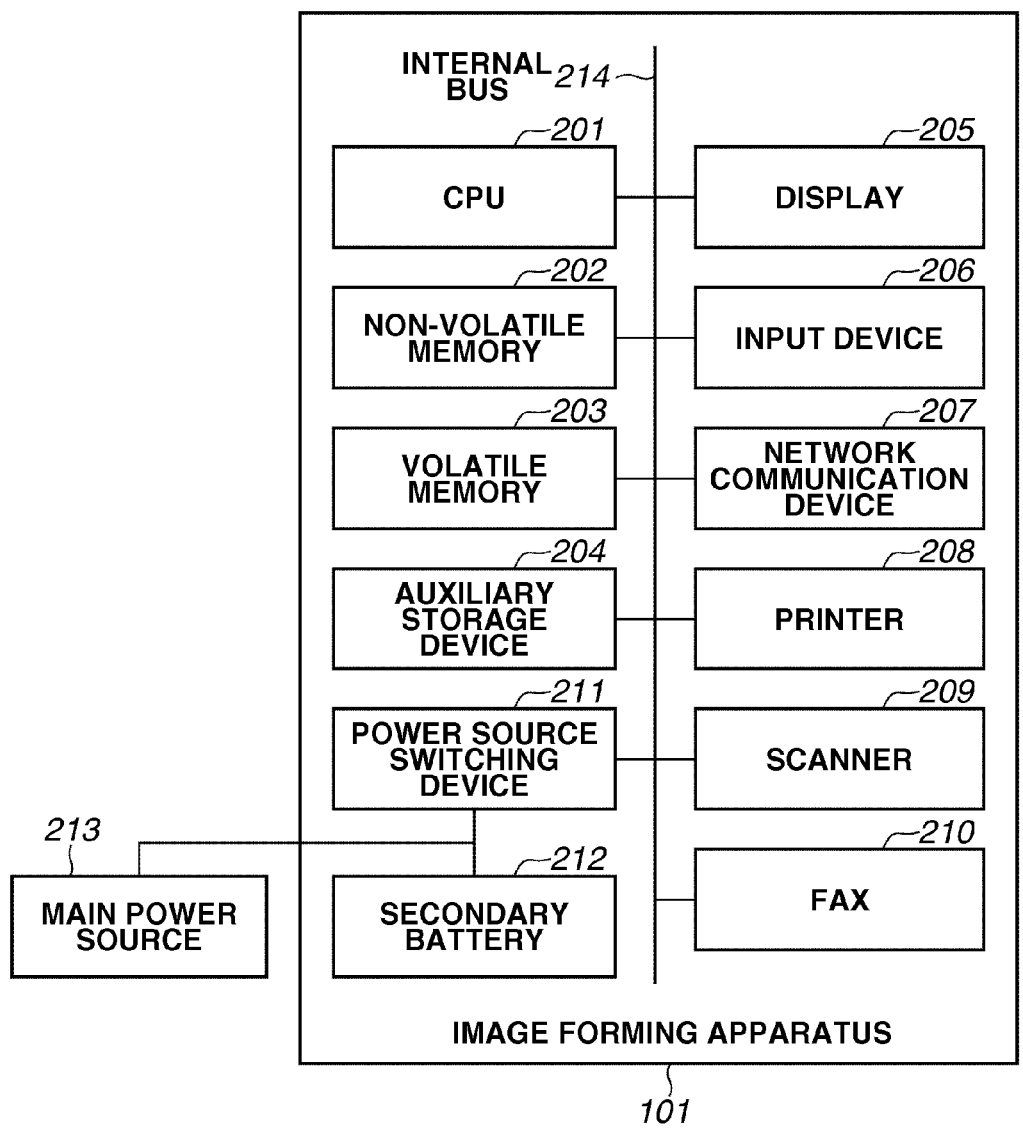
FIG. 2 illustrates a hardware configuration of the image forming apparatus illustrated in FIG. 1.

FIG. 2 illustrates a hardware configuration of the image forming apparatus 101 illustrated in FIG. 1.

Referring to FIG. 2, a central processing unit (CPU) 201 executes a program, and controls various types of processing. A non-volatile memory 202 is constituted by a read only memory (ROM), and stores a program and data required in an initial stage in startup processing of the apparatus. A volatile memory 203 is constituted by a random access memory (RAM), and is used as an area where a program and data are temporarily stored.

An auxiliary storage device 204 is constituted by a mass storage device such as a hard disk or a RAM drive, and stores large-volume data and holds an execution code of a program. The auxiliary storage device 204 stores data required to be held for a long time, compared to the above-described volatile memory 203. Because the auxiliary storage device 204 is a non-volatile storage device, the auxiliary storage device 204 can keep storing data even when the image forming apparatus 101 is powered off.

A display 205 is a device for notifying an operator of information. In the present exemplary embodiment, the operator is assumed to be the user in the user environment 100. An input device 206 is a device for accepting a user's selection/instruction and transmitting it to a program via an internal bus 204.

A network communication device 207 is a device for establishing communication with another information processing apparatus via a network.

A printer 208 is a device for printing image data formed by the image forming apparatus 101 or image data stored in the above-described auxiliary storage device 204 on a paper medium. A scanner 209 is a device that optically reads a document set on a document positioning plate of the image forming apparatus 101 to form image data corresponding to an image of the document.

A facsimile machine (FAX) 210 is a device for transferring the document read by the scanner 209 to a remote location with use of a telephone line.

These printer 208, scanner 209, and FAX 210 are a device group that executes a print/copy control job accepted by the image forming apparatus 101. Upon completion of this execution, they transmit a signal for notifying a control unit 306, which will be described below, of this completion.

A power source switching device 211 is a device that switches a power supply source to a secondary battery 212, which will be described below, when power supply stops from a main power source 213 for some reason. The main power source 213 serves a main power supply source to drive the image forming apparatus 101. In other words, the power source switching device 211 switches the power supply source from the main power source 213 to a power storage unit (the secondary batter 212) according to the image forming apparatus 101 shifting to a power failure state.

The secondary battery 212 is configured so as to be able to store a predetermined power amount. The stored power is used as power for driving the image forming apparatus 101, when power supply stops from the main power source 212 for some reason as described above. Further, a power source for storing power into the secondary battery 212 may be the main power source 213, which will be described below, or may be another source. For example, the secondary battery 212 may use power generated from a solar panel connected to the image forming apparatus 101 as its power source.

The present exemplary embodiment is described assuming that the main power source 213 is embodied by a generally-used commercial power source supplied from a power company. The characteristic of an electric current when power is supplied may be an alternate current or may be a direct current. If the supplied electric current is an alternate current, this electric current is converted into a direct current using a not-illustrated rectifier to be used as driving power, or is used as power stored into the above-described secondary battery 212.

The internal bus 204 is a communication bus that connects the CPU 201, the non-volatile memory 202, the volatile memory 203, the auxiliary storage device 204, and the display 205 within the image forming apparatus 101 in a communicable state. Similarly, the internal bus 204 is a communication bus that connects the input device 206, the network communication device 207, the printer 208, the scanner 209, the FAX 210, and the power source switching device 211 within the image forming apparatus 101 in a communication-available state.

Figure 3:
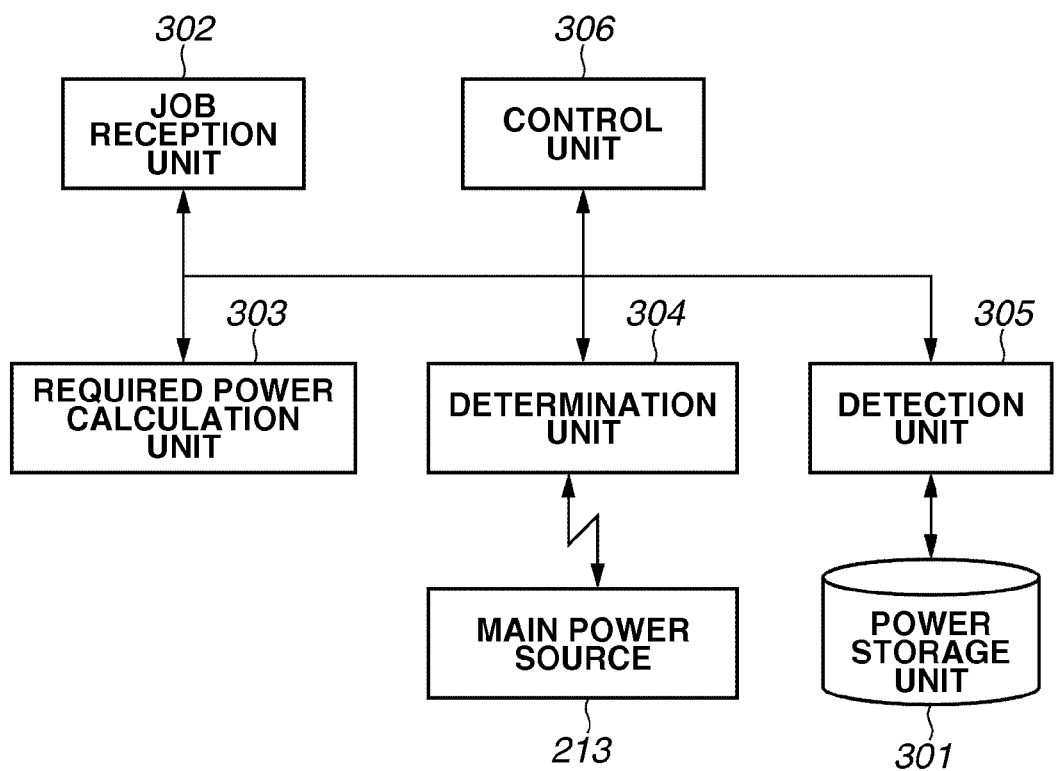
FIG. 3 illustrates a software configuration of the image forming apparatus illustrated in FIG. 2.

FIG. 3 illustrates a software configuration of the image forming apparatus 101 illustrated in FIG. 2.

Referring to FIG. 3, a power storage unit 301 is a unit that stores power from an external source such as the main power source 213 into the secondary battery 212. The power storage unit 301 is provided to enable the image forming apparatus 101 to operate even when power supply stops from the main power source 213 for some reason.

A job reception unit 302 is a unit that receives a job such as a print job, a copy job, a scan job, and a FAX job transmitted according to a user's instruction issued via the user terminal 102 or the display 205 of the image forming apparatus 101. Upon reception of a job, the job reception unit 302 holds the received job in the volatile memory 203, and notifies a required power calculation unit 303, a determination unit 304, a detection unit 305, and a control unit 306, which will be described below, of this job reception.

The required power calculation unit 303 is a unit that calculates a power amount required to execute a job from the content of the job received by the job reception unit 302.

The determination unit 304 is a unit that determines whether power is being supplied from the main power source 213 at that moment. The detection unit 305 is a unit that detects a power amount stored in the power storage unit 301.

The control unit 306 is a unit that determines whether the image forming apparatus 101 can execute a job received by the job reception unit 302 based on a calculation result by the required power amount calculation unit 303, a determination result by the determination unit 304, and a detection result by the detection unit 305, and switches control of the job according to the determination.

FIG. 4 is a flowchart illustrating a method for controlling the image forming apparatus 101 according to the first exemplary embodiment. The present example is an example of a processing procedure of job control by the image forming apparatus 101. The respective units that perform steps illustrated in FIG. 4 are stored in any storage device among the non-volatile memory 202, the volatile memory 203, and the auxiliary storage device 204, and are executed by the CPU 201. In the following description of the steps, the steps will be described assuming that actors thereof are the modules (software) executed by the CPU 201. The image forming apparatus 101 performs control in such a manner that, if the power supply source is the secondary battery 212 when a job is received, and the image forming apparatus 101 determines that the received job can be executed, the image forming apparatus 101 starts to process the job, and does not accept a job subsequently received by the network communication device 207 during the processing of the preceding job. This control is described now.

In step S401, the job reception unit 302 receives a first job received from the user, and transmits a signal reporting this reception to the required power calculation unit 303, the determination unit 304, the detection unit 305, and the control unit 306. The job data of the received first job is held in the volatile memory 203.

In step S402, upon reception of the above-described job reception signal, the determination unit 304 determines whether power is being supplied from the main power source 213 at this moment, and notifies the control unit 306 of a determination result thereof.

If the determination unit 304 determines that power is being supplied from the main power source 213 (NO in step S402), upon reception of a notification indicating that, the control unit 306 instructs a device in the image forming apparatus 101 that is supposed to execute the job received and held in the volatile memory 203 in step S401, to execute it. Then, in step S413, the device that received this instruction starts to execute the first job. Then, the processing proceeds to step S414.

In step S414, the control unit 306 determines whether the execution of the first job is completed according to whether the control unit 306 has received a signal notifying the control unit 306 of completion of the execution of the first job from the device instructed to execute the first job by the control unit 306 in step S413. If the job is not completed yet (NO in step S414), the processing proceeds to step S413 again, and the control unit 306 repeats step S414 until the execution of the job is completed. On the other hand, if the job is completed (YES in step S414), the processing proceeds to step S415.

In step S415, the control unit 306 determines whether a new job different from the first job is received after the job reception unit 302 received the first job in step S401. This determination is made based on whether the control unit 306 is notified of reception of a new job by the job reception unit 302. As a result of the determination, if the control unit 306 determines that a new job is received (YES in step S415), the processing proceeds to step S401 again, and the processing according to this flow is repeated, treating the new job as the first job. On the other hand, if no new job is received (NO in step S415), the control unit 306 ends the present processing.

On the other hand, if the determination unit 304 determines that power is not being supplied from the main power source 213 in step S402 (YES in step S402), the control unit 306 instructs the required power calculation unit 303 to calculate a power amount required to execute the above-described first job. Further, the control unit 306 instructs the detection unit 305 to detect a power amount stored in the power storage unit 301 at that moment. Then, in step S403, upon reception of the instruction from the control unit 306, the required power calculation unit 303 calculates the power amount required to execute the first job, and notifies the control unit 306 of a calculation result thereof.

In step S404, upon reception of the instruction from the control unit 306, the detection unit 305 detects the power amount stored in the power storage unit 301 at that moment, and notifies the control unit 306 of a detection result thereof.

In step S405, the control unit 306 compares the power amount required to execute the first job with the power amount stored in the power storage unit 301 at that moment based on the notification received from the required power calculation unit in step S403 and the notification received from the detection unit 305 in step S404. As a result of the comparison, if the control unit 306 determines that the power amount required to execute the first job is larger (NO in step S405), the processing proceeds to step S411. On the other hand, if the control unit 306 determines that the power amount stored in the power storage unit 301 is larger (YES in step S405), the processing proceeds to step S406.

In step S411 (NO in step S405), the control unit 306 displays, for example, a screen illustrated in FIG. 5A on the display 205 of the image forming apparatus 101 or a not-illustrated display of the user terminal 102. By this display, the control unit 306 notifies the user that the first job received in step S401 cannot be executed.

After that, the processing proceeds to step S412 at a predetermined timing. As the predetermined timing, for example, step S412 may be performed after a predetermined time has elapsed since the display of the UI screen illustrated in FIG. 5A. Alternatively, a button 501 may be provided on the UI screen displayed in step S411, for example, as illustrated in FIG. 5B, and step S412 may be performed after the button 501 is pressed by the user. Further alternatively, step S412 may be performed based on a combination of these conditions, i.e., either after the predetermined time has elapsed or after the button 501 is pressed.

Further, the destination of the display of the screen notifying the user that the first job cannot be executed is determined according to a flow illustrated in FIG. 6, which will be described below, based on whether the device used in issue of the instruction to execute the first job by the user is the image forming apparatus 101 or the user terminal 102.

Figure 6:
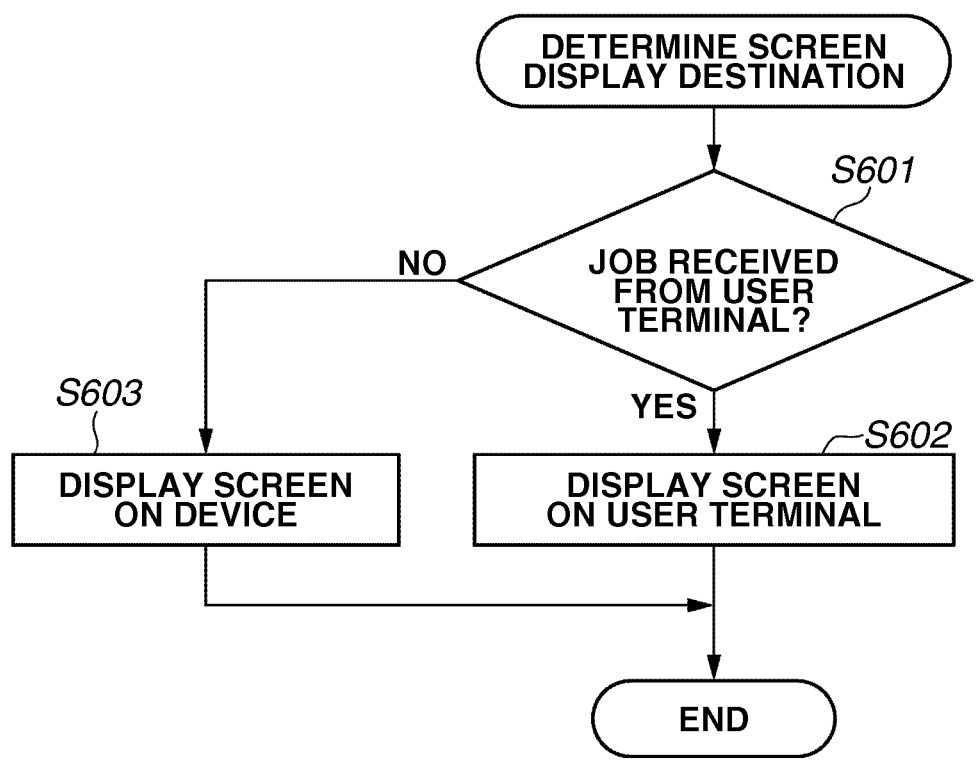
FIG. 6 is a flowchart illustrating a method for controlling the image forming apparatus according to the first exemplary embodiment.

FIG. 6 is a flowchart illustrating a method for controlling the image forming apparatus 101 according to the first exemplary embodiment. This example is an example of processing for determining the screen display destination. In the following description of steps, the steps will be described assuming that actors thereof are the modules (software) executed by the CPU 201.

First, in step S601, the control unit 306 determines whether the first job received by the job reception unit 302 in step S401 was issued to be executed from the user terminal 102. As a result of the determination, if the control unit 306 determines that the first job was issued to be executed from the user terminal 102 (YES in step S601), the processing proceeds to step S602. Then, in step S602, the control unit 306 determines that the screen display destination regarding step S411 should be the user terminal 102. On the other hand, if the control unit 306 determines that the first job was issued to be executed from the image forming apparatus 101 (NO in step S601), the control unit 306 determines that the screen display destination should be the display 205 of the image forming apparatus 101, and ends the present processing.

At this time, returning to the flow illustrated in FIG. 4, in step S412, the control unit 306 discards the first job received by the job reception unit 302 and held in the volatile memory 203 in step S401, and then ends the present processing.

On the other hand, in step S406 (YES in step S405), the control unit 306 executes the first job received by the job reception unit 302 and held in the volatile memory 203 in step S401. More specifically, the control unit 306 instructs any one or more of the printer 208, the scanner 209, and the FAX 210 to execute the first job according to the type of the first job. Upon reception of this instruction, the printer 208, the scanner 209, or the FAX 210 starts to execute the first job. Then, the processing proceeds to step S407.

In step S407, the control unit 306 determines whether a second job different from the first job is received after the job reception unit 302 received the first job in step S401. This determination is made based on whether the control unit 306 is notified of reception of the second job by the job reception unit 302. As a result of the determination, if the control unit 306 determines that the second job is received (YES in step S407), the processing proceeds to step S408. If the control unit 306 determines that the second job is not received (NO in step S407), the processing proceeds to step S410.

Figure 7:
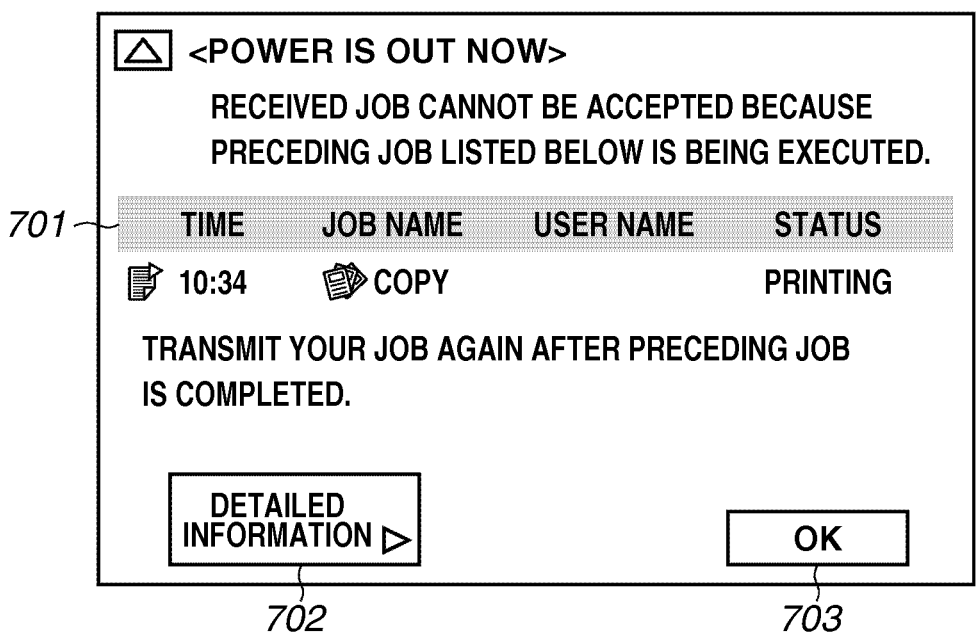
FIG. 7 illustrates a UI screen that notifies the user of the result about whether the received job is accepted.

Then, in step S408 (YES in step S407), the control unit 306 displays, for example, a UI screen 701 illustrated in FIG. 7 on the display 205 of the image forming apparatus 101 or the not-illustrated display of the user terminal 102. By this display, the control unit 306 notifies the user that the second job received after step S401 cannot be executed. At this time, the control unit 306 may also display information about the preceding job being executed (i.e., the first job) so as to indicate it together with the inability to execute the second job on the UI screen 701, for example, like the screen illustrated in FIG. 7.

Further, the UI screen 701 includes a button 702 that allows the user, who instructed the image forming apparatus 101 to execute the second job, to request a browse of detailed information of the preceding job indicated in the screen 701 within the same screen, and the user presses the button 702. Then, the control unit 306 may perform control so as to display a UI screen indicating the detailed information of the preceding job, as illustrated in FIG. 8.

After that, the processing proceeds to step S409 at a predetermined timing. As the predetermined timing, for example, step S409 may be performed after a predetermined time has elapsed since the display of the UI screen illustrated in FIG. 7. Alternatively, a button 703 may be provided on the UI screen displayed in step S408 as illustrated in FIG. 7, and step S409 may be performed after the button 703 is pressed by the user. Further alternatively, step S409 may be performed based on a combination of these conditions, i.e., either after the predetermined time has elapsed or after the button 703 is pressed.

Further, the destination of the display of the screen notifying the user that the second job cannot be executed is determined according to the flow illustrated in FIG. 6 based on whether the device used in issue of the instruction to execute the second job by the user is the image forming apparatus 101 or the user terminal 102. This determination flow is similar to the above-described flow, and, therefore, a description thereof is omitted here.

Then, in step S409, the control unit 406 discards the second job received by the job reception unit 302 and held in the volatile memory 203. Then, the processing proceeds to step S410.

In step S410, the control unit 306 determines whether the control unit 306 has received a signal notifying the control unit 306 of completion of the execution of the first job from the device instructed to execute the first job by the control unit 306 in step S406, in a similar manner to the above-described step S414. Based on that, the control unit 306 determines whether the execution of the first job is completed. If the control unit 306 determines in step S410 that the first job is not completed (NO in step S410), the processing proceeds to step S407 again.

On the other hand, if the control unit 306 determines that the job is completed (YES in step S410), the processing proceeds to step S415. The process in step S415 has been already described above, and, therefore, will not be described repeatedly.

According to the above-described first exemplary embodiment of the present invention, the MFP configured to operate using the secondary battery at the time of a power failure can provide the following effect.

It is possible to prevent occurrence of such a situation that the MFP becomes unable to complete a preceding job being executed by accepting another job (the second job described in the description of the present exemplary embodiment) during execution of the preceding job (the first job described in the description of the present exemplary embodiment) at the time of a power failure.

The first exemplary embodiment has been described as an exemplary embodiment in which there is the already accepted first job during a power failure, and if the second job is received after that (YES in step S407), the image forming apparatus 101 discards the subsequently received second job without accepting it. By carrying out the exemplary embodiment of the present invention in this manner, it becomes possible to prevent occurrence of such a situation that the power stored in the power storage unit 301 is consumed by acceptance of the second job, resulting in a shortage of the stored power to make execution of the first job impossible.

However, according to a second exemplary embodiment, if there is the already accepted first job during a power failure (YES in step S407), the image forming apparatus 101 calculates power required to execute the second job received after that, unlike the first exemplary embodiment. Then, the second exemplary embodiment may be such an exemplary embodiment that, if the image forming apparatus 101 determines that both the first job and the second job can be executed, the image forming apparatus 101 also accepts the second job, and executes both of them. In the following description, this exemplary embodiment will be described with reference to the drawings.

A system configuration, a hardware configuration, and a software configuration including the image forming apparatus 101 according to the second exemplary embodiment are similar to those illustrated in FIGS. 1, 2, and 3, respectively, and, therefore, descriptions thereof will be omitted below. Among processing procedures according to the second exemplary embodiment that will be described below, descriptions of portions having contents similar to those described in the description of the first exemplary embodiment will be omitted as much as possible, and only portions having different processing contents will be described below.

Figure 9:
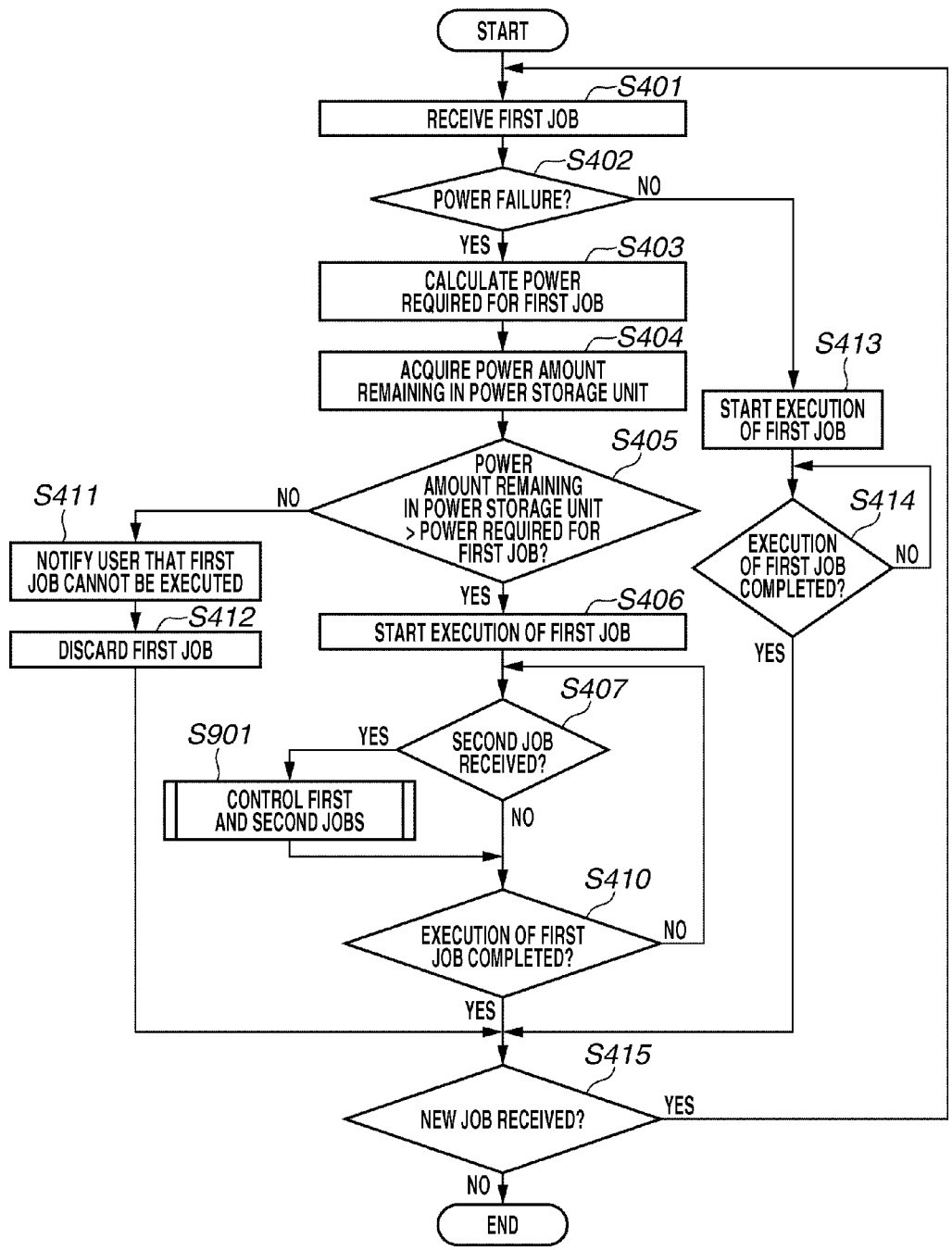
FIG. 9 is a flowchart illustrating a method for controlling an image forming apparatus according to a second exemplary embodiment.

FIG. 9 is a flowchart illustrating a method for controlling the image forming apparatus 101 according to the second exemplary embodiment. The present example is an example of a processing procedure of job control by the image forming apparatus 101. The respective units that perform steps illustrated in FIG. 9 are stored in any storage device among the non-volatile memory 202, the volatile memory 203, and the auxiliary storage device 204, and are executed by the CPU 201. In the following description of the steps, the steps will be described assuming that actors thereof are modules (software) executed by the CPU 201. The respective steps illustrated in FIG. 9 are similar to those in the processing according to the first exemplary embodiment described with reference to FIG. 4 except for a process in step S901, whereby only processes in a portion relating to step S901 will be described below.

The first job is accepted and starts to be executed during the power failure by the processes from step S401 to step S406. However, only step S404 is different from the first exemplary embodiment, and the detection unit 305 also holds the power amount stored in the power storage unit 301 into the volatile memory 203 at the time of acquisition.

Subsequently, in step S407, the control unit 306 receives a notification indicating that the second job different from the first job is received by the job reception unit 302. Then, the control unit 306 instructs the required power calculation unit 303 to calculate the power amount required to execute the above-described first job, and then advances to processing for controlling the first job and the second job according to the present exemplary embodiment in step S901.

FIG. 10 is a flowchart illustrating a method for controlling the image forming apparatus 101 according to the second exemplary embodiment. The present example is an example of a detailed procedure of step S901 illustrated in FIG. 9. The respective units that perform steps illustrated in FIG. 10 are stored in any storage device among the non-volatile memory 202, the volatile memory 203, and the auxiliary storage device 204, and are executed by the CPU 201. In the following description of the steps, the steps will be described assuming that actors thereof are modules (software) executed by the CPU 201.

First, in step S1001, upon reception of an instruction from the control unit 306, the required power calculation unit 303 calculates a power amount required to execute the second job, and notifies the control unit 306 of a calculation result thereof. Then, the processing proceeds to step S1002.

In step S1002, upon being notified of the power amount required to execute the second job by the required power calculation unit 303, the control unit 306 reads out the power amount stored in the power storage unit 301, which is held in the volatile memory 203 in step S404. Then, the control unit 306 compares the read-out power amount with a sum of the power amount required to execute the first job and the power amount required to execute the second job respectively calculated by the required power calculation unit 303 in step S403 and step S1001 to determine which is larger. As a result of this comparison, if the control unit 306 determines that the power amount stored in the power storage unit 301 is larger (YES in step S1002), the processing proceeds to step S1003. If the control unit 306 determines that the power amount stored in the power storage unit 301 is smaller (NO in step S1002), the processing proceeds to step S408.

The processes from step S408 to step S410 are similar to the processes described in the description of the first exemplary embodiment, and, therefore, descriptions thereof are omitted here.

In step S1003, the control unit 306 instructs any one or more of the printer 208, the scanner 209, and the FAX 210 instructed to execute the first job in step S406 to resume the execution of the first job. Upon reception of this instruction, the printer 208, the scanner 209, or the FAX 210 resumes the execution of the first job, and then the processing proceeds to step S1004. The printer 208, the scanner 209, or the FAX 210 that resumed the execution of the first job at this time notifies the control unit 306 of completion of the execution after the execution is completed.

Subsequently, in step S1004, the control unit 306 determines whether the printer 208, the scanner 209, or the FAX 210 instructed to execute the first job has completed the execution of the first job based on whether there is a notification from the above-described these devices. As a result of the determination, if the control unit 306 determines that the execution of the first job is not completed (NO in step S1004), the processing proceeds to step S1004 again.

On the other hand, if the control unit 306 determines that the execution of the first job is completed (YES in step S1004), the processing proceeds to step S1005.

As processes in step S1005 and step S1006 subsequent thereto, the control unit 306 performs, on the second job, processes similar to the processes in step S1003 and step S0014 until the completion of the execution of the first job. After the execution of the second job is completed, the control unit 306 performs the processes in step S410 and the subsequent steps. Step S410 and the subsequent steps are similar to the first exemplary embodiment, and, therefore, descriptions thereof are omitted here.

According to the above-described second exemplary embodiment, the MFP configured to operate using the secondary battery at the time of a power failure becomes able to accept and execute both the first and second jobs if the remaining capacity of the secondary battery is sufficient in addition to the effect of the first exemplary embodiment. As a result, the usability is improved for the user.

The above-described second exemplary embodiment has been described as an exemplary embodiment in which there is the already accepted first job during a power failure, and the image forming apparatus 101 accepts and executes both the first job and the second job even if the second job is received after that (YES in step S407). The image forming apparatus 101 can accept both the first job and the second job when the power amount stored in the power storage unit 301 is sufficient to execute both the first job and the second job (YES in step S1002). As a result, it is possible to prevent occurrence of such a situation that the second job cannot be accepted although the second job can be executed actually in consideration of the stored power amount, thereby improving the usability for the user.

The example in which the series of processes from step S1001 to step S1006 are performed sequentially in this order has been described as the processing procedure according to the second exemplary embodiment described with reference to FIG. 10. However, these processes may be performed in such a manner that some of them are performed in parallel. Such an exemplary embodiment will be described as a third exemplary embodiment with reference to the drawings.

A system configuration, a hardware configuration, and a software configuration including the image forming apparatus 101 according to the third exemplary embodiment are similar to those illustrated in FIGS. 1, 2, and 3, respectively, and, therefore, descriptions thereof will be omitted below. Among processing procedures according to the third exemplary embodiment that will be described below, descriptions of portions having contents similar to those described in the descriptions of the first and second exemplary embodiments will be omitted as much as possible, and only portions having different processing contents will be described below.

Figure 11A:
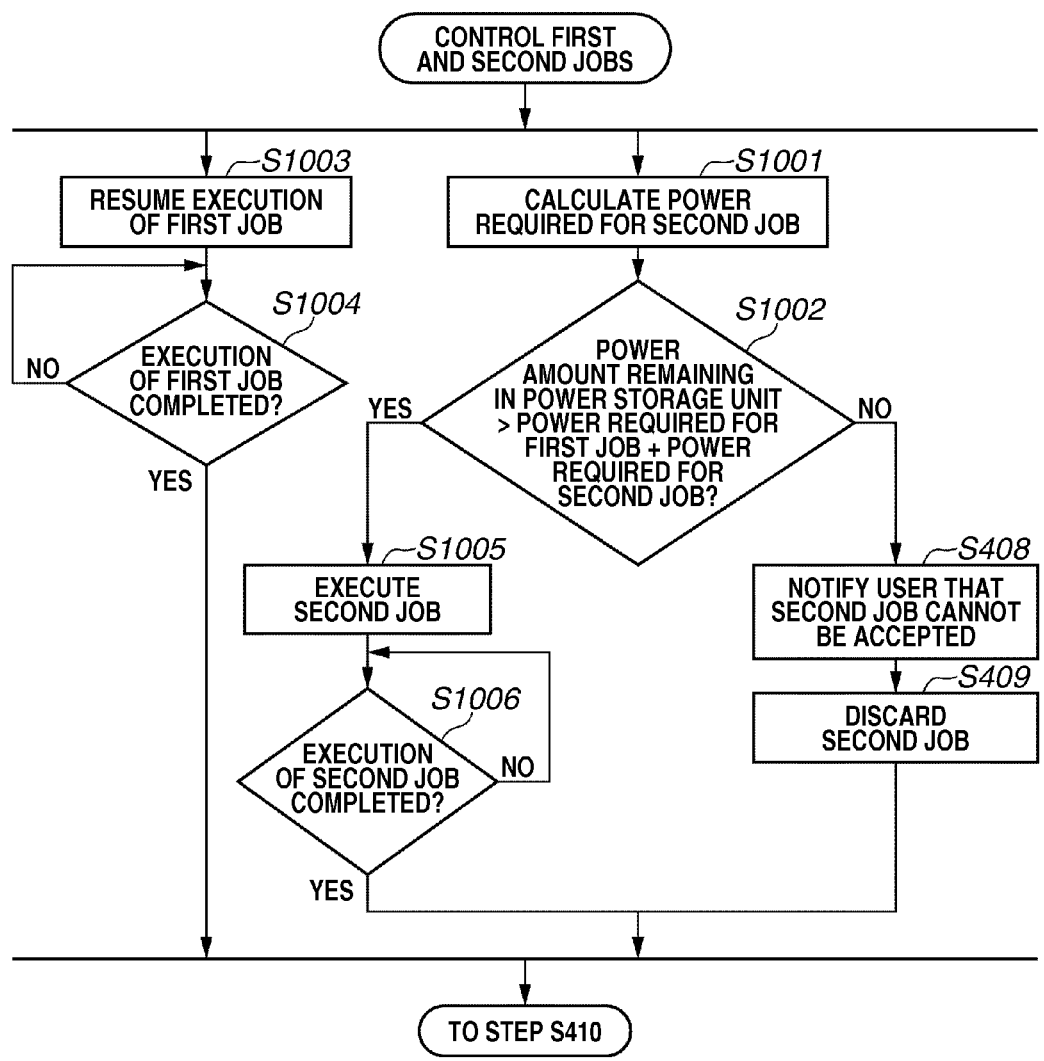

FIGS. 11A and 11B each are a flowchart illustrating a method for controlling the image forming apparatus 101 according to the third exemplary embodiment. The present examples each are an example of a processing procedure of job control by the image forming apparatus 101. The respective units that perform steps illustrated in FIGS. 11A and 11B are stored in any storage device among the non-volatile memory 202, the volatile memory 203, and the auxiliary storage device 204, and are executed by the CPU 201. In the following description of the steps, the steps will be described assuming that actors thereof are modules (software) executed by the CPU 201. The respective steps illustrated in FIGS. 11A and 11B are similar to those in the processing according to the second exemplary embodiment described with reference to FIGS. 9 and 10 except for the order of the steps, whereby descriptions of process contents of the respective steps will be omitted, and only the order of the processes will be described below.

First, FIG. 11A illustrates an example of the order of the detailed process of step S901 illustrated in FIG. 9. According to this order, the control unit 306 compares a power amount required for a process group (steps S1003 and S1004) regarding control of the first job already accepted and started to be executed by the control unit 306 as of step S901, and a process group regarding control of the second job, with the remaining capacity of the power storage unit 301. Then, the control unit 306 performs the process group (steps S1003 and S1004) regarding control of the first job, and processes of steps S1002, S1005, and S1006 if the control unit 306 determines that the process group regarding control of the second job can be executed (YES in step S1002), or a process group (steps S408 and S409) for discarding the second job, in parallel. Then, after the control unit 306 detects that both the process groups are completed, the processing proceeds to step S410. The order of the processes thereafter is similar to the first and second exemplary embodiments, and, therefore, a description thereof is omitted here.

Next, FIG. 11B illustrates another example of the order in the detailed process of step S901 illustrated in FIG. 9. According to this order, the control unit 306 performs the process group (steps S1003 and S1004) regarding control of the first job already accepted and started to be executed as of step S901, and the process (step S1001) for calculating the power amount required to execute the second job in parallel. After the control unit 306 detects that both of them are completed, the processing proceeds to the subsequent step, step S1002. The order of the processes thereafter is similar to the second exemplary embodiment, and, therefore, a description thereof is omitted here.

By carrying out the present exemplary embodiment according to the process orders of the above-described two examples, it becomes possible to time-efficiently perform the processes for executing the first job, and the series of processes from the determination whether the second job can be executed until execution or discard of the second job.

Normally, jobs handled by the image forming apparatus 101 and subjected to print/copy control are stored in a job queue, which is managed in the volatile memory 203, in the order that the job reception unit 302 received them. Therefore, the control unit 306 instructs a device corresponding to each job (the printer 208, the scanner 209, or the FAX 210) to execute the job according to that order, and each device executes it. However, among jobs, there is a job called an interrupt job, which is immediately accepted and executed regardless of the order in the above-described job queue, once the job is received by the job reception unit 302.

Figure 12:
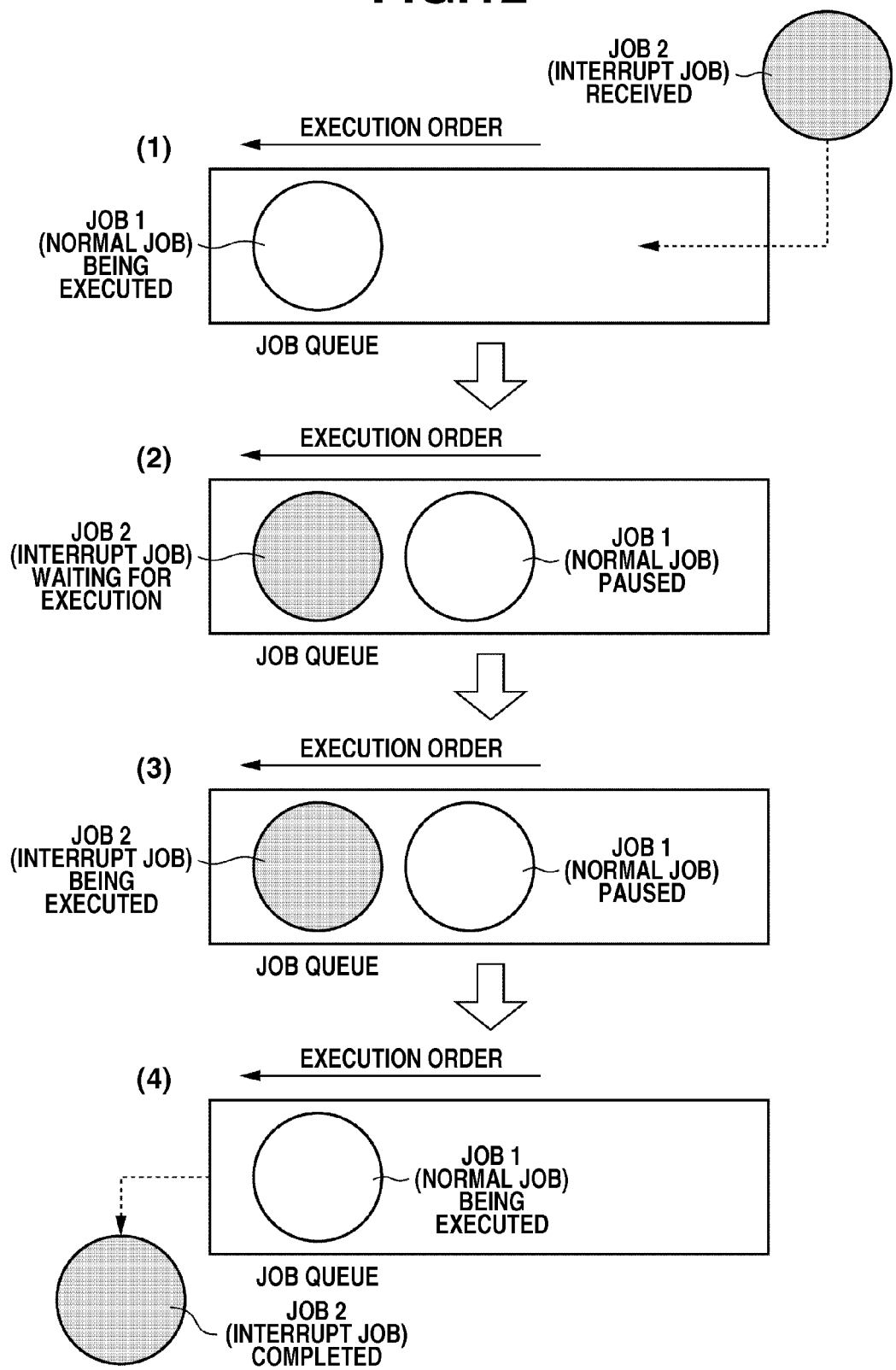
FIG. 12 illustrates an order in which an interrupt job is executed in the image forming apparatus during a normal operation.

FIG. 12 illustrates a job processing state of the image forming apparatus 101 according to a fourth exemplary embodiment. The present example is an example of a flow of a series of states from reception of an interrupt job until completion of execution thereof. FIG. 12 indicates that states of the above-described job queue and jobs stored therein shift to statuses (1) to (4) in this order chronologically. Each job illustrated in FIG. 12 is labeled as (INTERRUPT JOB) if the job is an interrupt job, or is otherwise labeled as (NORMAL JOB).

Further, states which each job can be set in during a period from reception thereof until completion of execution thereof include "RECEIVED", "WAITING FOR EXECUTION", "BEING EXECUTED", "COMPLETED", and "PAUSED". The "RECEIVED" state indicates that the job is received by the job reception unit 302, and is in the middle of being held in the job queue in the volatile memory 203. Next, once the job is held in the job queue, the job shifts to the "WAITING FOR EXECUTION" state. At this time, this job is set in a state waiting to be executed by the printer 208, the scanner 209, or the FAX 210 according to an instruction from the control unit 306.

Subsequently, once the job in the "WAITING FOR EXECUTION" state is placed at the head of the job queue, this job shifts to the "BEING EXECUTED" state. At this time, this job is executed by the printer 208, the scanner 209, or the FAX 210. Then, once the job is completed, the job shifts to the "COMPLETED" state. At this time, the job is removed from the job queue by the control unit 306.

Aside from the flow of the series of these states, there is the "PAUSED" state in which an instruction is issued from the control unit 306 for some reason, and the processing on this job is temporarily suspended. This refers to, for example, such a state that, when the above-described interrupt job is received, processing on a job already placed in the job queue and set in the "BEING EXECUTED" state or the "WAITING FOR EXECUTION" state is suspended until execution of the interrupt job is preferentially completed.

This shift among the states illustrate in FIG. 12 will be described in detail now. First, in the status (1), a job 2 (an interrupt job) is newly received (the job 2 shifts to the "RECEIVED" state) in the job queue that contains a job 1 (a normal job) "BEING EXECUTED". Subsequently, in the status (2), the job 2, which is the interrupt job, shifts from the "RECEIVED" state to the "WAITING FOR EXECUTION" state. At the same time as this shift, the control unit 306 issues an instruction to a device involving execution of the job 1, among the printer 208, the scanner 209, and the FAX 210, thereby setting the job 1 into the "PAUSED" state. At this time, the job 2 is placed at the head of the job queue, and is executed in the subsequent status (3). In the status (4), the execution of the job 2 is completed (the job 2 shifts to the "COMPLETED" state). The job 1, which is set in the "PAUSED" state until then, shifts to the "BEING EXECUTED" state, which is the state of the job 1 immediately before the job 1 shifts to the "PAUSED" state.

In this manner, as described with reference to FIG. 12, the interrupt job is a job having a characteristic of being executed prior to a job "BEING EXECUTED" even when another job (a normal job) is placed in the job queue as a job "BEING EXECUTED" or "WAITING FOR EXECUTION" until then.

Therefore, in the MFP configured to operate using the secondary battery at the time of a power failure, the job 2 is preferentially executed and completed in the statuses (3) and (4) if the status of the job queue shifts as described with reference to FIG. 12. As a result, the power stored in the secondary battery is consumed, and the job 1 accepted before that may be unable to be completed due to a shortage of the remaining capacity of the secondary battery. This problem can be solved by carrying out an exemplary embodiment of the present invention appropriately. Such an exemplary embodiment will be described as a fourth exemplary embodiment with reference to the drawings.

A system configuration, a hardware configuration, and a software configuration including the image forming apparatus 101 according to the fourth exemplary embodiment are similar to those illustrated in FIGS. 1, 2, and 3, respectively, and, therefore, descriptions thereof will be omitted below. Further, among processing procedures according to the fourth exemplary embodiment that will be described below, descriptions of portions having contents similar to those described in the descriptions of the first, second, and third exemplary embodiments will be omitted as much as possible, and only portions having different processing contents will be described below.

Figure 13:
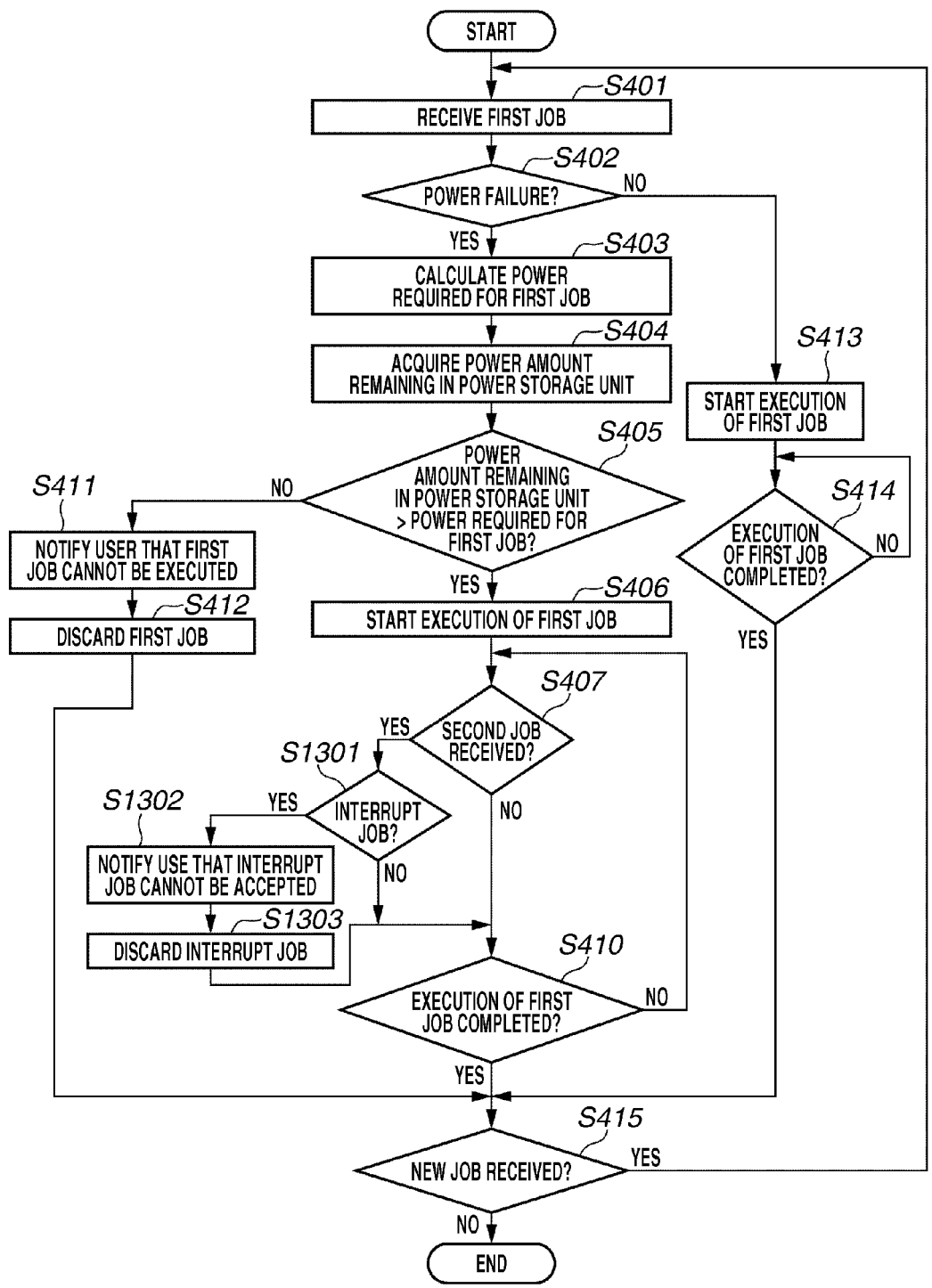
FIG. 13 is a flowchart illustrating a method for controlling an image forming apparatus according to a fourth exemplary embodiment.

FIG. 13 is a flowchart illustrating a method for controlling the image forming apparatus 101 according to the fourth exemplary embodiment. The present example is an example of a processing procedure of job control by the image forming apparatus 101. The respective units that perform steps illustrated in FIG. 13 are stored in any storage device among the non-volatile memory 202, the volatile memory 203, and the auxiliary storage device 204, and are executed by the CPU 201. In the following description of the steps, the steps will be described assuming that actors thereof are modules (software) executed by the CPU 201.

In the following description, the processing illustrated in FIG. 13 will be described by way of example with use of FIG. 14, which illustrates a state shift in the job queue in a case where a job execution scenario similar to the above-described scenario illustrated in FIG. 12 is applied to the present exemplary embodiment.

The processes from step S401 to step S406 are performed in a similar manner to the first, second, and third exemplary embodiments, and the job 1, which is a normal job, starts to be executed as the first job. Because the job 2, which is an interrupt job, is received as the second job in the subsequent step, step S407 (YES in step S407, the status (1) in FIG. 14), the processing proceeds to the subsequent step, step S1301, which is a process characteristic of the present exemplary embodiment.

In step S1301, the control unit 306 determines whether the second job held in the volatile memory 203 is an interrupt job. As a result of the determination, if the control unit 306 determines that the second job is an interrupt job (YES in step S1301), the processing proceeds to step S1302. On the other hand, if the control unit 306 determines that the second job is not an interrupt job (NO in step S1301), the processing proceeds to step S410. After that, processes similar to the first exemplary embodiment are performed. According to the present exemplary embodiment, the second job, i.e., the job 2, is an interrupt job, whereby the processing proceeds to step S1302.

Figure 15:
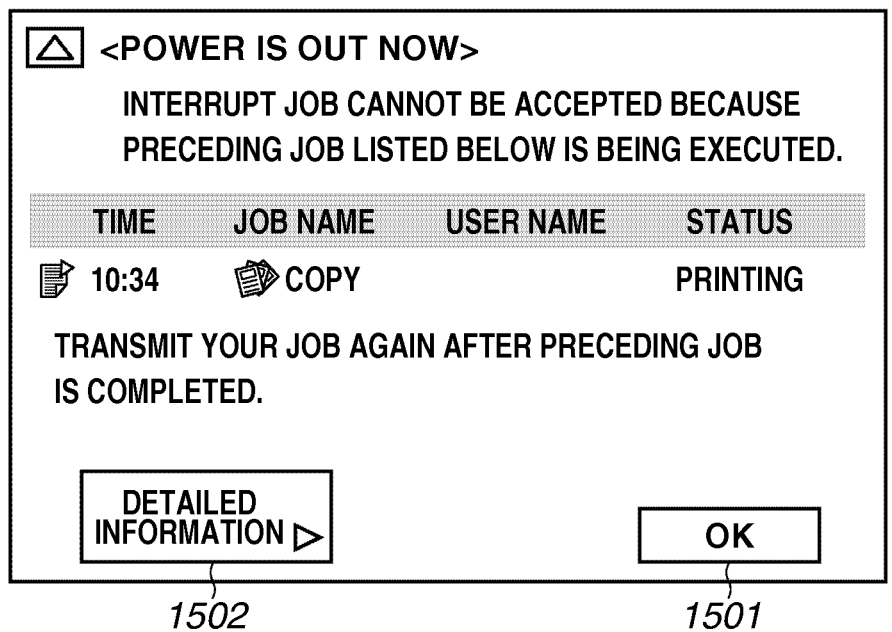
FIG. 15 illustrates a UI screen that notifies the user of the result about whether the received job is accepted.

In step S1302, the control unit 306 displays, for example, a UI screen illustrated in FIG. 15 on the display 205 of the image forming apparatus 101 or the not-illustrated display of the user terminal 102, thereby notifying the user that the interrupt job cannot be executed.

After that, the processing proceeds to step S1303 at a predetermined timing. As the predetermined timing, for example, step S1303 may be performed after a predetermined time has elapsed since the display of the UI screen illustrated in FIG. 15. Alternatively, a button 1501 may be provided on the UI screen displayed in step S1302 as illustrated in FIG. 15, and step S1303 may be performed after the button 1501 is pressed by the user. Further alternatively, step S1303 may be performed based on a combination of these conditions, i.e., either after the predetermined time has elapsed or after the button 1501 is pressed.

Further, the destination of the display of the screen notifying the user that the interrupt job cannot be executed is determined based on whether the device used in issue of the instruction to execute the interrupt job by the user is the image forming apparatus 101 or the user terminal 102 according to the flow illustrated in FIG. 6 described in the description of the first exemplary embodiment. Further, the UI screen includes a button 1502 that allows the user, who instructed the image forming apparatus 101 to execute the interrupt job, to request viewing of detailed information of the preceding job within the same screen, and the user presses the button 1502. Then, the control unit 306 may perform control so as to display the UI screen indicating the detailed information of the preceding job, which has been described above with reference to FIG. 8.

Figure 14:
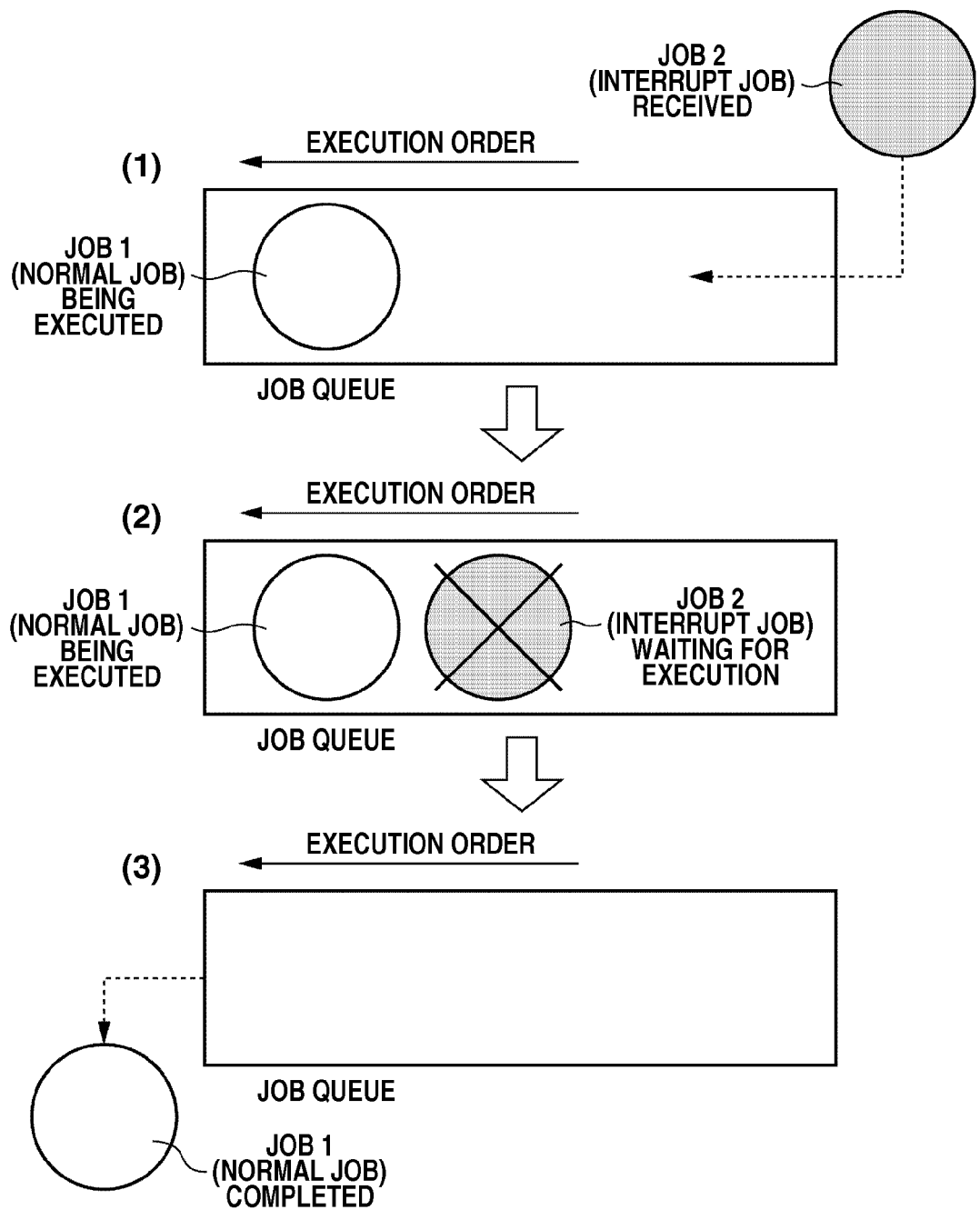
FIG. 14 illustrates an order in which the interrupt job is executed in the image forming apparatus at the time of a power failure.

In step S1303, the control unit 306 discards the interrupt job (the job 2) received by the job reception unit 302 and held in the volatile memory 203 in step S407 (a status (2) in FIG. 14). Then, the processing proceeds to step S410. The processes thereafter are similar to the first exemplary embodiment, and therefore descriptions thereof are omitted here.

Suppose that the MFP, which is configured to operate using the secondary battery at the time of a power failure, receives another interrupt job (the second job, the interrupt job) during execution of a certain job (the first job) during a power failure. In this case, according to the above-described fourth exemplary embodiment, the interrupt job is canceled, whereby it becomes possible to prevent occurrence of such a situation that the first job becomes unable to be completed because the interrupt job is preferentially executed to lead to a shortage of the power stored in the secondary battery.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-230601 filed Oct. 18, 2012, which is hereby incorporated by reference herein in its entirety.

What is claimed is:

1. An image forming apparatus configured to perform job processing, the image forming apparatus comprising:
a switching unit configured to switch a power supply source from a main power source to a power storage unit according to the image forming apparatus shifting to a power failure state;
a reception unit configured to receive a job;
a calculation unit configured to calculate a first power amount to be consumed when processing the received job if the power supply source is the power storage unit at the time the job is received;
a detection unit configured to detect a second power amount stored in the power storage unit;
a determining unit configured to determine whether the received job can be executed based on the detected second power amount and the calculated first power amount; and
a control unit configured to process the job if the determining unit determines that the received job can be executed, and to control so as not to accept a job subsequently received by the reception unit while processing the job.

2. An image forming apparatus configured to perform job processing, the image forming apparatus comprising:
a switching unit configured to switch a power supply source from a main power source to a power storage unit according to the image forming apparatus shifting to a power failure state;
a reception unit configured to receive a job and a subsequent job;
a calculation unit configured to calculate a first power amount to be consumed when processing the received job if the power supply source is the power storage unit at the time the job is received and a second power amount to be consumed when processing the received subsequent job if the power supply source is the power storage unit at the time the subsequent job is received;
a detection unit configured to detect a third power amount stored in the power storage unit;
a determining unit configured to determine whether the received job can be executed based on the detected third power amount and the calculated first power amount and
a control unit configured to process the job if the determining unit determines that the received job can be executed, and to decide whether the subsequent job can be accepted based on the calculated second power amount, the detected third power amount, and the calculated first power amount if the subsequent job is received by the reception unit while the job is being processed.

3. The image forming apparatus according to claim 1, further comprising a display unit configured to display that the job cannot be executed, if the determining unit determines that the job cannot be executed.

4. The image forming apparatus according to claim 1, wherein the control unit discards the received job.

5. The image forming apparatus according to claim 2, wherein the control unit discards the received subsequent job.

6. A job control method, executed by one or more processors, for an image forming apparatus configured to perform job processing, the job control method comprising:
switching a power supply source from a main power source to a power storage unit according to the image forming apparatus shifting to a power failure state;
receiving a job;
calculating a first power amount to be consumed when processing the received job if the power supply source is the power storage unit at the time the job is received;
detecting a second power amount stored in the power storage unit;
determining whether the received job can be executed based on the detected second power amount and the calculated first power amount;
processing the job if it is determined that the received job can be executed; and
controlling so as not to accept a subsequently received job while processing the job.

7. A job control method, executed by one or more processors, for an image forming apparatus configured to perform job processing, the job control method comprising:
switching a power supply source from a main power source to a power storage unit according to the image forming apparatus shifting to a power failure state;
receiving a job and a subsequent job;
calculating a first power amount to be consumed when processing the received job if the power supply source is the power storage unit at the time the job is received and a second power amount to be consumed when processing the received subsequent job if the power supply source is the power storage unit at the time the subsequent job is received;
detecting a third power amount stored in the power storage unit;
determining whether the received job can be executed based on the detected third power amount and the calculated first power amount;
processing the job if it is determined that the received job can be executed; and
determining whether the received subsequent job can be executed based on the detected third power amount, the calculated first power amount, and the calculated second power amount if the subsequent job is received while the job is being processed.

8. A non-transitory computer-readable storage medium storing a program that causes a computer to execute the job control method according to claim 6.

9. A non-transitory computer-readable storage medium storing a program that causes a computer to execute the job control method according to claim 7.

* * * * *